US008083387B2

(12) United States Patent
Soellner et al.

(10) Patent No.: US 8,083,387 B2
(45) Date of Patent: Dec. 27, 2011

(54) SUBASSEMBLY FOR THE MOUNTING OF A HEADLIGHT

(75) Inventors: Michael Soellner, Grafenau-Doffingen (DE); Jorg Kusche, Oelbronn-Duerrn (DE); Reza Shakory-Tabrizi, Markgroeningen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 319 days.

(21) Appl. No.: 12/430,559

(22) Filed: Apr. 27, 2009

(65) Prior Publication Data
US 2009/0303740 A1 Dec. 10, 2009

(30) Foreign Application Priority Data
Jun. 5, 2008 (DE) .......................... 10 2008 026 996

(51) Int. Cl.
*B60Q 1/06* (2006.01)

(52) U.S. Cl. ........ 362/507; 362/369; 362/390; 362/496; 362/506; 362/549; 296/187.09; 296/187.1

(58) Field of Classification Search .................... 362/21, 362/369, 390, 496, 506, 507, 546, 549; 248/200; 296/187.09, 187.1, 187.03, 203.02
See application file for complete search history.

(56) References Cited

U.S. PATENT DOCUMENTS

| | | | | |
|---|---|---|---|---|
| 4,573,734 A * | 3/1986 | Gass | ........................ | 296/187.09 |
| 5,711,597 A * | 1/1998 | Unno | ............................ | 362/640 |
| 6,478,456 B1 * | 11/2002 | Eichhorn et al. | ............. | 362/369 |
| 6,840,659 B2 * | 1/2005 | Brown et al. | ................. | 362/487 |
| 6,846,038 B1 * | 1/2005 | White et al. | ............. | 296/193.11 |
| 6,945,593 B2 * | 9/2005 | Andre et al. | ............. | 296/187.09 |
| 7,008,008 B2 * | 3/2006 | Andre et al. | ............. | 296/203.02 |
| 7,029,154 B2 * | 4/2006 | Arlon et al. | ................... | 362/507 |
| 7,156,545 B2 * | 1/2007 | Arlon | ............................ | 362/549 |
| 7,264,388 B2 * | 9/2007 | Shakory-Tabrizi | ........... | 362/549 |
| 7,296,824 B2 * | 11/2007 | Yasui et al. | .................... | 280/784 |
| 7,677,779 B2 * | 3/2010 | Schwab | ........................ | 362/546 |
| 7,926,868 B2 * | 4/2011 | Braunbeck et al. | ...... | 296/187.03 |
| 2001/0011833 A1 * | 8/2001 | Artner et al. | .................. | 296/189 |
| 2002/0126493 A1 * | 9/2002 | Changeur et al. | ............ | 362/487 |
| 2004/0012975 A1 * | 1/2004 | Chase et al. | .................... | 362/505 |
| 2005/0088015 A1 | 4/2005 | Kishikawa et al. | | |
| 2005/0134092 A1 | 6/2005 | Lazzeroni | | |
| 2005/0174795 A1 | 8/2005 | Tazaki et al. | | |
| 2007/0029840 A1 * | 2/2007 | Marijnissen et al. | .... | 296/187.03 |

(Continued)

FOREIGN PATENT DOCUMENTS
DE 4311419 10/1994
(Continued)

*Primary Examiner* — Jong-Suk (James) Lee
*Assistant Examiner* — Stanley Weinberg
(74) *Attorney, Agent, or Firm* — Gerald E. Hespos; Michael J. Porco

(57) ABSTRACT

A deformable subassembly (1) for mounting of headlight in the region of a recess (5) in a wing (4) of a motor vehicle has a sealing channel body (6) connected to the wing (4) in the region of a joint with a motor vehicle bonnet. A headlight cup (3) for mounting the headlight is connected on one side to the sealing channel body (6) spaced from the wing (4). A lower side of the headlight cup (3) is connected to a bracket body (7) that is connected to a supporting structure (8) of the motor vehicle. The sealing channel body (6), headlight cup (3) and/or the bracket body (7) are configured to deform in the event of an impact with a pedestrian so that the risk of injury to the pedestrian is reduced.

7 Claims, 4 Drawing Sheets

U.S. PATENT DOCUMENTS

| | | |
|---|---|---|
| 2007/0091624 A1 | 4/2007 | Takata et al. |
| 2008/0001436 A1* | 1/2008 | Bierjon et al. .................. 296/192 |
| 2008/0157564 A1* | 7/2008 | Thenier et al. ............ 296/187.03 |
| 2008/0272616 A1* | 11/2008 | Wolf .......................... 296/181.5 |
| 2010/0067252 A1* | 3/2010 | Schwab ......................... 362/549 |

FOREIGN PATENT DOCUMENTS

| | | |
|---|---|---|
| DE | 102008024428 | 11/2009 |
| EP | 1 577 610 A1 | 9/2005 |
| EP | 1577610 | 9/2005 |
| JP | 2008013166 | 1/2008 |

* cited by examiner

SUBASSEMBLY FOR THE MOUNTING OF A HEADLIGHT

CROSS REFERENCE TO RELATED APPLICATION

This application claims priority under 35 USC 119 to German Patent Application No. 10 2008 026996.4 filed on Jun. 5, 2008, the entire disclosure of which is incorporated herein by reference.

BACKGROUND OF THE INVENTION

1. Field of the Invention

The invention relates to a subassembly for mounting a headlight in the region of a recess in a wing of a motor vehicle. The subassembly has a deformation body.

2. Description of the Related Art

EP 1 577 610 A1 discloses a subassembly for the mounting a headlight of a motor vehicle. The subassembly has a headlight housing, a support body for the headlight housing and a deformation body connected fixedly to the support body. The support body is attached to the vehicle frame by a fastening device. The deformation body protrudes in the direction of illumination of the headlight over the headlight housing and is offset laterally with respect thereto. An impact against the headlight subassembly, in particular the impact of a pedestrian, is absorbed efficiently and gently.

A disadvantage of the known subassembly is that the deformation takes place exclusively in the region of the separate deformation body. Other parts of the subassembly cannot contribute to a relevant extent to absorbing an impact on the subassembly, in particular an impact of a pedestrian.

It is an object of the invention to provide a subassembly for mounting a headlight that provides enhanced deformation in the region of the wing and headlight of the vehicle in response to an impact of a pedestrian for reducing the risk of injury to the pedestrian.

SUMMARY OF THE INVENTION

The invention relates to a subassembly for mounting a headlight in a wing at a region of a joint with a motor vehicle bonnet that is connected to a sealing channel body. The subassembly also includes a headlight cup for mounting the headlight. The headlight cup is connected on one side to the sealing channel body and on a part of the sealing channel body spaced from the wing. Additionally, the headlight cup is connected on its lower side to a bracket body that is connected to a supporting structure of the motor vehicle. The construction unit formed by the sealing channel body, the headlight cup and the bracket body forms the deformation body.

The headlight cup is configured to be deformed in the event of an impact and also is mounted in a manner that it is suitable for deformation.

The sealing channel body preferably forms a deformation region of the deformation body. For example, the sealing channel body may be an angled strip, and preferably is a strip angled at a substantially right angle. The limbs of the angled strip preferably are connected to the wing and to the headlight cup, and a deformable indentation preferably is formed between the limbs. The deformation of the sealing channel body results primarily from the deformability of the indentation between the two limbs of the sealing channel body in the event of an application of force that has a predominant force component from above, such as the force generated by impact of a pedestrian. The force of the impact exerted on the wing is transmitted from the wing to the sealing channel body and causes the sealing channel body to deform in the region of its indentation. A certain degree of deformability also is provided in the region of the limbs, which can bend under the action of the force acting on the wing. The limb of the sealing channel body that is connected to the wing preferably has cutouts between the connecting region of the limb to the wing. The cutouts are open toward the free edge of the limb. The open cutouts enable the limb of the sealing channel body to buckle in the event of an impact force acting on the wing. Thus, the sealing channel body can be deformed particularly effectively in this region.

The limbs of the sealing channel body preferably are connected to the wing and the headlight cup by clinch connections. This connecting technique contains a multiple advantages. Better energy absorption by means of deformation can be ensured by adapting the clinching point spacings. The open cutouts of the sealing channel body preferably are positioned between clinching point arrangements. The cutouts at these positions achieve local weakening of the sealing channel body and hence provide a greater deformation distance in the event of an impact of a pedestrian, in particular an impact of a pedestrian's head. Finally, the connection of the sealing channel body with wing and/or headlight cup permits precise alignment of the headlight cup with respect to the wing during assembly. Therefore the headlight can be mounted in the headlight cup and aligned precisely with respect to the recess in the wing with a minimum expenditure of time. The headlight mounted on the headlight cup can be aligned precisely so that the headlight ends flush with the wing toward the visible outer side.

The headlight cup preferably has a receiving plate for the headlight. The receiving plate is connected to the wing, and a reinforcing component is connected to the receiving plate and to the sealing channel body. The reinforcing component defines a deformation region of the deformation body in addition to the above-described deformation region formed by the sealing channel body. The reinforcing component preferably is a frame part that has an outer periphery and one or more large openings inwardly from the outer periphery. Thus, the headlight cup preferably has a two-part design formed by the receiving plate and the reinforcing component. The headlight cup will deform in the region of the frame-shaped reinforcing component during an impact of a pedestrian while the relatively stiff receiving plate permits a precise mounting of the headlight. The reinforcing component is deformed substantially in the plane defined by the outer peripheral parts of the frame.

The reinforcing component preferably has a reinforcing component limb that is connected to the sealing channel body by clinch connections. Also the transition between the limb of the reinforcing component and other parts of the reinforcing component will deform in a specific manner in the event of application of a deformation force. The design of the sealing channel body with the limb facing the headlight cup and the design of the reinforcing component of the headlight cup with the limb that bears against the limb of the sealing channel body limits the connection of sealing channel body and headlight cup to the two limbs. The connection produced by clinching is particularly advantageous. Also, the spaces between the clinching point in this region are adapted to ensure optimum energy absorption by means of deformation.

A further deformation region of the deformation body preferably is formed in the bracket body between the supporting structure of the motor vehicle and the headlight cup, and particularly in the receiving plate of the headlight cup. The bracket body preferably has two bracket sections arranged at an angle to each other, and most preferably at a right angle to each other. A deformation region of the deformation body is formed by weakening the bracket body in the connecting region of the two bracket sections. The weakening is represented, for example, as a constriction of the bracket body in the connecting region of the two bracket sections. The bracket sections constitute separate components that are connected by clinch connections. Thus, the headlight cup and the headlight are positioned exactly by a defined arrangement of the bracket sections with respect to each other and by clinching the bracket sections in position.

The wing, the sealing channel body, the headlight cup and/or the bracket body preferably consist of sheet metal, in particular aluminum sheet. Aluminum sheet is best suitable for clinching sheet-metal parts, in particular deformed sheet-metal parts, to each other.

DETAILED DESCRIPTION OF THE PREFERRED EMBODIMENTS

Figure 1:
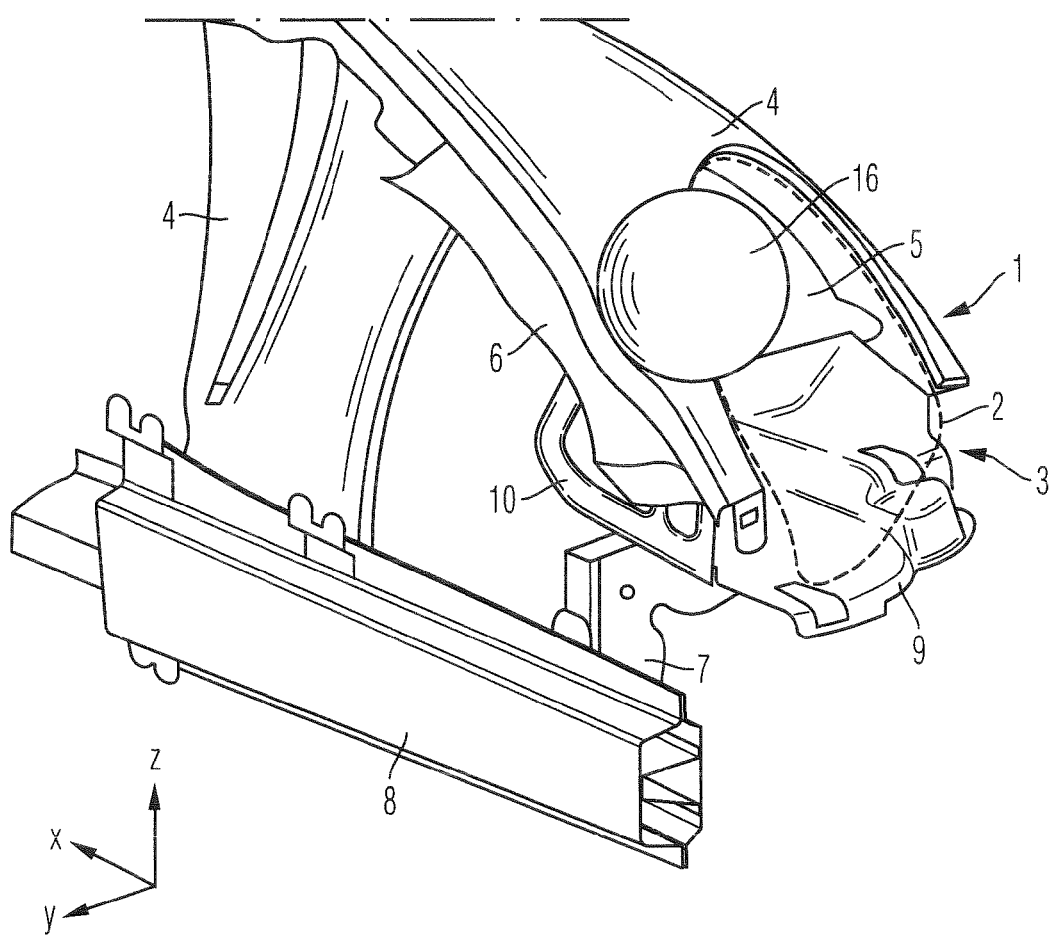
FIG. 1 is a perspective view of a subassembly for mounting a headlight, with the glass contour of the headlight shown by dashed lines and a test body that impacts against the wing between the headlight glass and an opening for a bonnet symbolizes a pedestrian's head.
Figure 2:
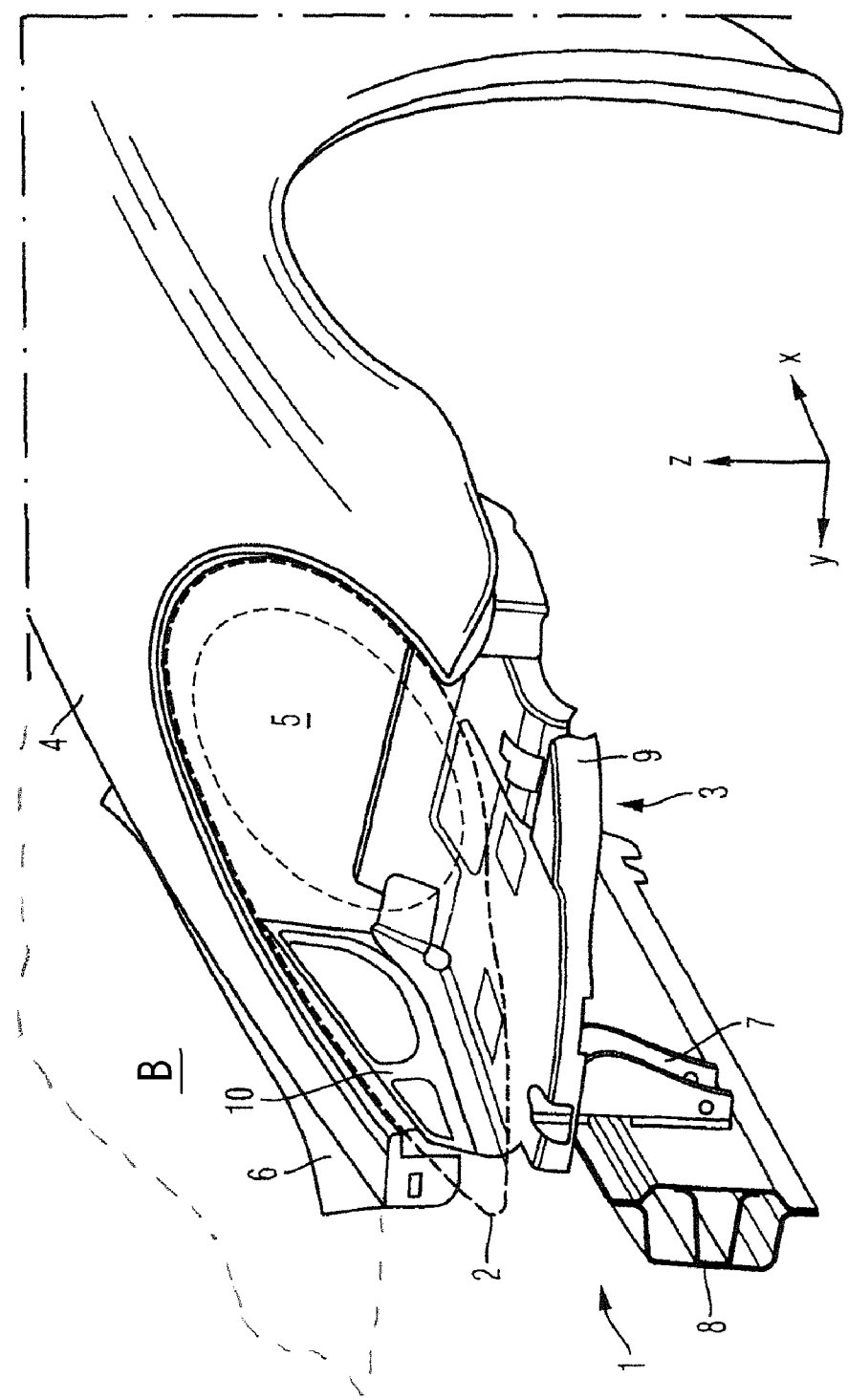
FIG. 2 is a perspective view of the subassembly of FIG. 1 from a different viewing direction.
Figure 3:
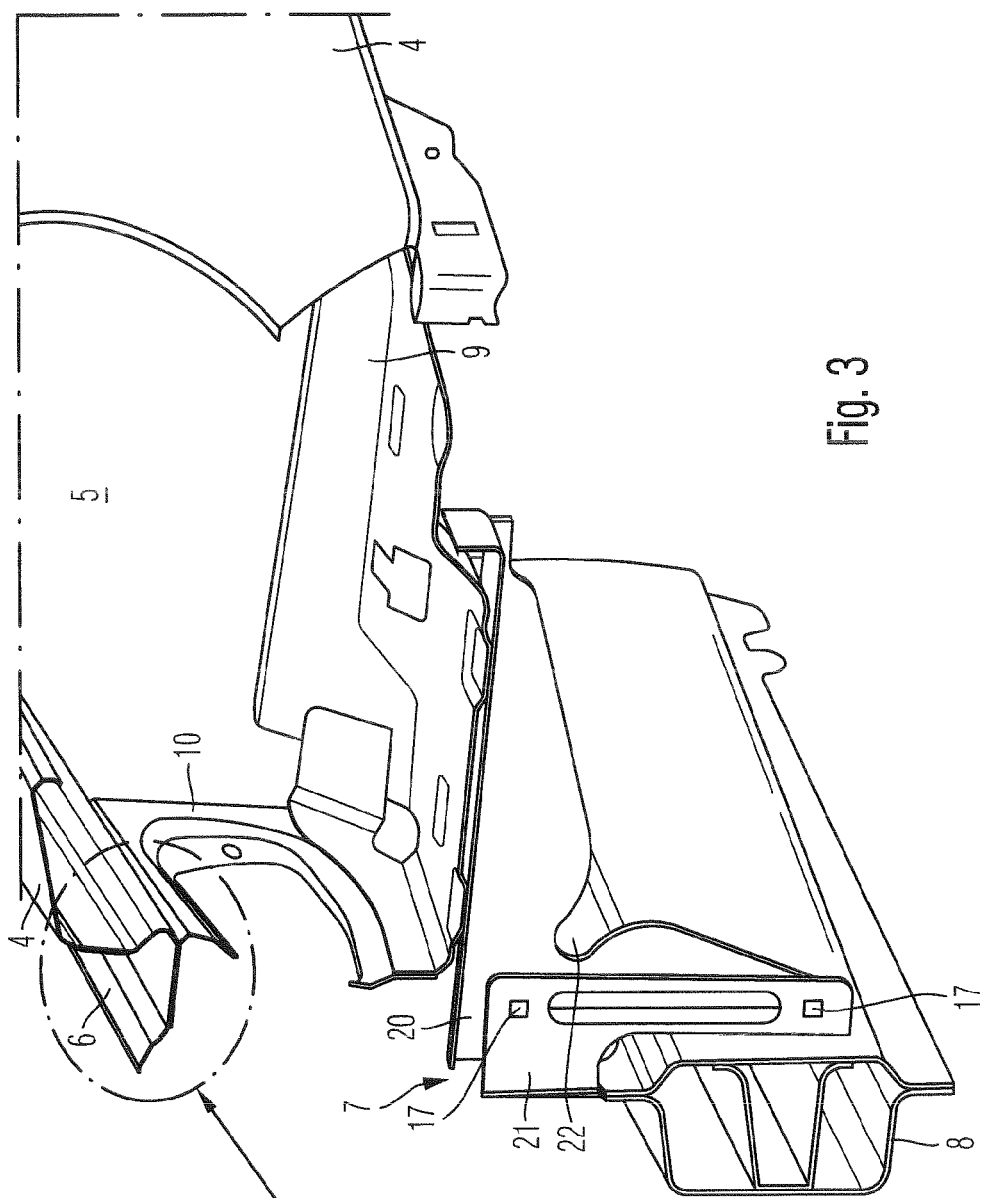
FIG. 3 is a vertical cross-section of the subassembly of FIGS. 1 and 2 through the supporting structure for the headlight cup.

A subassembly in accordance with the invention for mounting a headlight is identified by the numeral 1 in FIGS. 1 to 3. The headlight includes headlight glass 2, which is illustrated by dashed lines to show the outer contour thereof. The subassembly 1 has a headlight cup 3 for mounting the headlight, a wing 4 with a recess 5 that is matched to the cross-sectional shape of the headlight glass 2, a sealing channel body 6 that is connected to the wing 4, and a bracket body 7 that is connected to a lower part of the headlight cup 3. The wing 4 is at the front left or right part of the motor vehicle and extends generally from the left or right wheel house to the area of the bonnet B or hood/trunk lid. The sealing channel body 6 extends along the side of the wing 4 closer to the center line of the motor vehicle. The bracket body 7 is connected to a supporting structure 8 of the motor vehicle, in the present case of a passenger vehicle. The supporting structure 8 extends generally in the longitudinal direction of the vehicle and is disposed lower than the sealing channel body 6. The bracket body 7 is bolted to the supporting structure 8.

The headlight cup 3, the wing 4, the sealing channel body 6 and the bracket body 7 are formed from aluminum sheet, and hence are best suitable for connection to one another by clinching.

The headlight cup 3 is of two-part design and comprises a receiving plate 9 and a frame 10 that are connected to each other by clinching. The headlight is positioned on and fastened to the receiving plate 9. The frame 10 defines a reinforcing component with an outer periphery and one or more large openings inward of the outer periphery. The receiving plate 9 is substantially horizontal and the frame 10 is substantially vertical in the fitted position of the subassembly 1. The upper peripheral part of the frame 10 facing away from the receiving plate 9 is connected by clinching to the wing 5 adjacent to the wheel house of the vehicle, as shown in FIG. 2.

Figure 4:
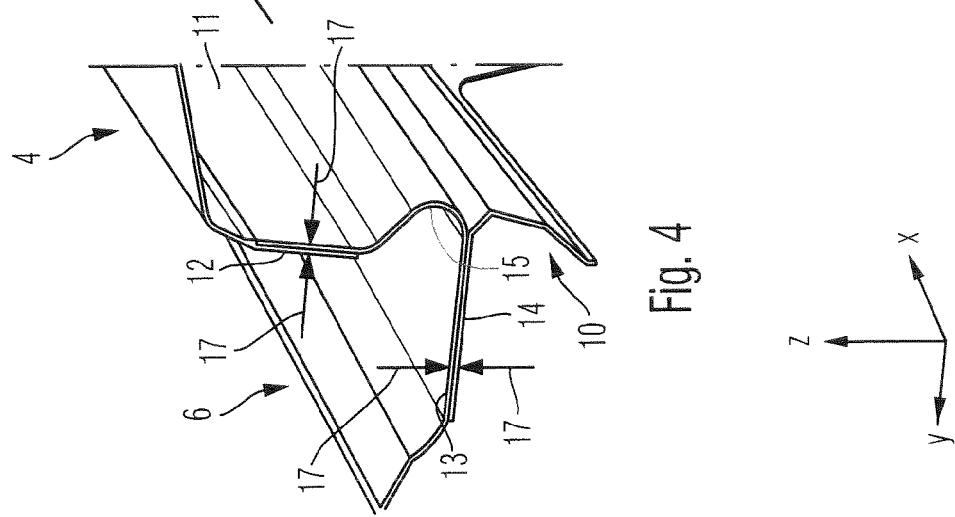
FIG. 4 is a section through the connecting region of wing and sealing channel body.

The upper end of the frame 10 is not connected directly to the wing 4, but rather to the sealing channel body 6 which, in turn, is connected to the wing 4. As shown in FIG. 4, the sealing channel body 6 is a strip that is formed at a right angle with first and second limbs 11 and 13. The first limb 11 of the sealing channel body 6 is clinched in an overlapping arrangement to a downwardly angled limb 12 of the wing 4. The wing limb 12 bounds a joint between the wing 4 and a vehicle bonnet (not shown). The second limb 13 of the sealing channel body 6 is clinched in an overlapping arrangement to a limb 14 of the frame 10. The wing limb 12 is arranged substantially vertically, and the frame limb 14 is arranged substantially horizontally. The clinching of the sealing channel body 6 to the wing 4 and the frame 10 of the headlight cup 3 enables the headlight cup 3 to be aligned vertically and laterally precisely with respect to the wing 4 and to be clinched in the position set.

An indentation 15 is formed between the first and second limbs 11 and 13 of the sealing channel body 6. The indentation 15 ensures deformation between the limbs 11 and 13 of the sealing channel body 6 in the event of an impact of a pedestrian in the region of the wing 4 and the headlight glass 2. FIG. 1 illustrates a spherical test body 16 that impacts on the wing 4 in the region of the wing 4 and the headlight glass 2 and symbolizes the head of an impacting pedestrian. FIG. 1 illustrates that the sheet metal of the wing 4 bulges in the region adjacent to the sealing channel body 6 under the action of the test body 16.

Figure 5:
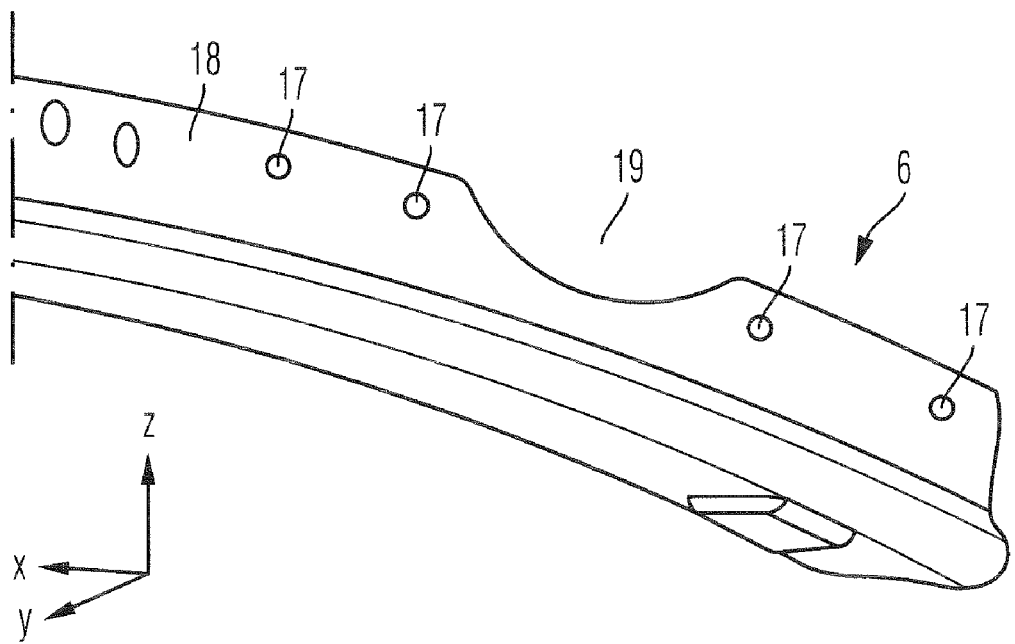
FIG. 5 is a modified design of the sealing channel body.
Figure 6:
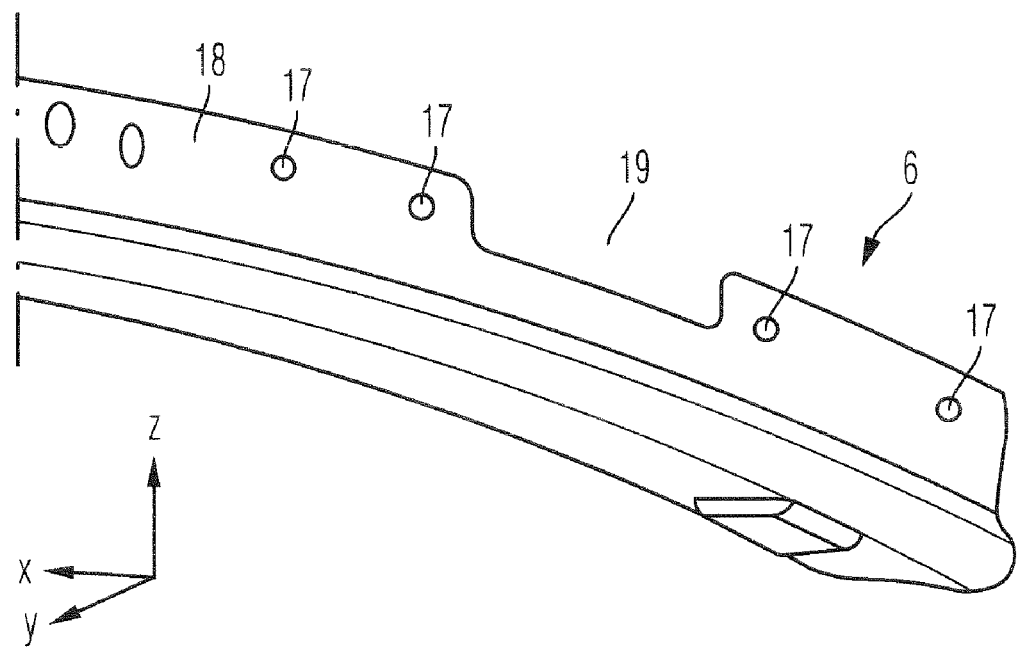
FIG. 6 is a further modified design of the sealing channel body.

Energy can be absorbed by deformation in the connecting region of the first limb 11 of the sealing channel body 6 to the limb 12 of the wing 4 by adapting the distances between the clinching points 17, as illustrated in FIGS. 5 and 6. These figures also clarify that further deformation distance is available to the pedestrian local weakening of the first limb 11 of the sealing channel body 6 by cutouts 19 that open toward the free edge 18 of the limb 11. The cutouts 19 can be curved as in the embodiment of FIG. 5 or rectangular as in the embodiment of FIG. 6.

The two-part design of the headlight cup 3 with the frame 10 results in a further deformation region because the large interior openings of the frame 10 permit the frame 10 to be deformed by bending or buckling in the event of an impact.

The bracket body 7 has two bracket sections 20 and 21 that are arranged at a right angle to each other and connected to each other by clinching. Thus, the two bracket sections 20 and 21 can be aligned precisely with one another before clinching to achieve precise alignment of both the horizontal bracket section 20 and the headlight cup 3. The bracket section 20 also is clinched to the headlight cup 3, and specifically to the receiving plate 9 thereof. The two bracket sections 20 and 21 have a weakening constriction 22 in their connecting region. The constriction 22 defines a further deformation region in the subassembly 1 by permitting the angular position of the two bracket sections 20 and 21 to change to an acute angle in the event of an impact.

The subassembly 1 therefore has plural components with individual deforming distances in the event of an impact of a pedestrian. More particularly, the wing 4, the sealing channel body 6, the headlight cup 3 in the region of the frame 10 thereof, and the bracket body 7 in the region of the constriction 22 all can be deformed.

What is claimed is:

1. A deformable subassembly for mounting a headlight in a region of a recess in a wing of a motor vehicle, the wing extending substantially from an outer side of the motor vehicle to a bonnet spaced inwardly from the outer side of the motor vehicle, the deformable subassembly comprising:
   a sealing channel body having a substantially vertical first limb connected to the wing in a region of the bonnet of the motor vehicle, a second limb aligned angularly to the first limb and a deformable indentation between the first and second limbs;
   a headlight cup having a substantially vertically aligned frame with an outer periphery having an upper part formed with a frame limb connected in face-to-face contact with the second limb of the sealing channel body at a position spaced from the wing and at least one opening inwardly of the outer periphery of the frame for permitting deformation of the fame in response to an impact, the headlight cup further having a receiving plate connected to a lower part of the frame below the sealing channel body, the receiving plate being configured for mounting the headlight; and
   a bracket body connected to a supporting structure of the motor vehicle and to a lower side of the receiving plate.

2. The deformable subassembly of claim 1, wherein the wing, the sealing channel body, the headlight cup and the bracket body are formed from aluminum sheet.

3. The deformable subassembly of claim 1, wherein the bracket body has first and second legs and a deformable constriction therebetween for facilitating deformation of the bracket body in response to an impact.

4. The deformable subassembly of claim 3, wherein the first and second legs of the bracket body are separate components connected by clinch connections.

5. The deformable subassembly of claim 1, wherein the wing includes a downwardly depending limb substantially adjacent the bonnet, the first limb of the sealing channel body being connected to the downwardly depending limb of the wing.

6. The deformable subassembly of claim 5, wherein the first limb of the sealing channel body has cutouts along an edge remote from the second limb and between connection points to the downwardly depending limb of the wing.

7. A deformable subassembly for mounting a headlight in a region of a recess in a wing of a motor vehicle, the wing extending substantially from an outer side of the motor vehicle to a bonnet spaced inwardly from the outer side of the motor vehicle, the deformable subassembly comprising:
   a sealing channel body having a substantially vertical first limb connected to the wing at a plurality of spaced apart locations in a region of the bonnet of the motor vehicle, at least one cutout being formed in the first limb between the connected locations of the first limb to the wing, a second limb aligned at a substantially right angle to the first limb and a deformable indentation between the first and second limbs;
   a headlight cup having a substantially vertically aligned frame with an outer periphery, a frame limb formed on the outer periphery and connected to the second limb of the sealing channel body and at least one deformable opening inwardly of the outer periphery of the frame, a receiving plate connected to a part of the frame below the sealing channel body and being configured for mounting the headlight; and
   a bracket body having a first leg connected to a lower side of the receiving plate, a second leg connected to a supporting structure of the motor vehicle and a deformable constriction between the first and second legs.

\* \* \* \* \*